US008872047B2

(12) United States Patent
Lin et al.

(10) Patent No.: US 8,872,047 B2
(45) Date of Patent: Oct. 28, 2014

(54) ANTI-PRYING ENCRYPTED KEYBOARD

(75) Inventors: Zhulong Lin, Guangzhou (CN); Junkun Zhang, Guangzhou (CN); Jing He, Guangzhou (CN); Ying Han, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 98 days.

(21) Appl. No.: 13/811,187

(22) PCT Filed: Jul. 22, 2011

(86) PCT No.: PCT/CN2011/077472
§ 371 (c)(1),
(2), (4) Date: Jan. 18, 2013

(87) PCT Pub. No.: WO2012/024994
PCT Pub. Date: Mar. 1, 2012

(65) Prior Publication Data
US 2013/0148804 A1    Jun. 13, 2013

(30) Foreign Application Priority Data

Aug. 27, 2010   (CN) .......................... 2010 1 0269450

(51) Int. Cl.
*H01H 9/04*     (2006.01)
*G06F 3/02*     (2006.01)
(Continued)

(52) U.S. Cl.
CPC .............. *G06F 21/86* (2013.01); *G06F 3/0202* (2013.01); *G06F 3/023* (2013.01); *G07F 19/201* (2013.01); *G07F 7/1033* (2013.01); *G06F 21/83* (2013.01)
USPC ....................................................... 200/302.1

(58) Field of Classification Search
USPC .......... 200/5 A, 302.1, 302.2; 380/52; 726/34
IPC ................... G06F 21/86; H01H 13/06,13/7006, H01H 13/705, 2223/002, 2223/008
See application file for complete search history.

(56) References Cited

U.S. PATENT DOCUMENTS 3,996,428 A * 12/1976 Buan et al. .................... 200/5 A
4,845,748 A    7/1989 Bohannon
(Continued)

FOREIGN PATENT DOCUMENTS

CN        1812031 A    8/2006
CN     201237811 Y    5/2009
(Continued)

OTHER PUBLICATIONS

International Search Report dated Oct. 19, 2011 from corresponding International Application No. PCT/CN2011/077473.
(Continued)

*Primary Examiner* — Vanessa Girardi
(74) *Attorney, Agent, or Firm* — Wolf, Greenfield & Sacks, P.C.

(57) ABSTRACT

An pry-proof encrypted keyboard. The encrypted keyboard comprises a keyboard panel (1), a lining board (2) assembled under the keyboard panel (1), a waterproof silicon rubber (4) and a main control panel (5). Convex rib circles (22) are provided on the circumference of the surface of the lining board (2) attached with the waterproof silicon rubber (4). The waterproof silicon rubber is extruded by the lining board (2) when the encrypted keyboard is assembled, and the thickness of corresponding waterproof silicon rubber (4) extruded by the convex rib circles (22) is less than 0.2 MM. The metallic lining board (2) can efficiently prevent fusion attack from the lateral face of the encrypted keyboard, meanwhile two convex rib circles (22) are added on the circumference of the surface of the lining board attached with the water silicon rubber (4), so that the thickness of the waterproof silicon rubber (4) at the grooves (41) is less than 0.2 MM, which is the diameter of the known thinnest needle, thus the attackers could not easily breakthrough the lining board (2) or the waterproof silicon rubber (4) to reach the inside of the encrypted keyboard, as a result illegally leading the wire out from the inside of the encrypted keyboard is efficiently prevented, thus the information of the keyboard is efficiently protected, and the security performance is improved.

11 Claims, 4 Drawing Sheets

(51) Int. Cl.
   *G06F 3/023*    (2006.01)
   *G07F 19/00*    (2006.01)
   *G07F 7/10*     (2006.01)
   *G06F 21/86*    (2013.01)
   *G06F 21/83*    (2013.01)

(56) References Cited

U.S. PATENT DOCUMENTS

| | | | | |
|---|---|---|---|---|
| 5,300,742 | A  * | 4/1994  | Huang | 200/302.2 |
| 6,054,939 | A  * | 4/2000  | Wei et al. | 341/20 |
| 6,104,319 | A    | 8/2000  | Shpater | |
| 6,156,983 | A  * | 12/2000 | Chen et al. | 200/302.1 |
| 7,012,206 | B2 * | 3/2006  | Oikawa | 200/302.1 |
| 7,270,275 | B1   | 9/2007  | Moreland et al. | |
| 2007/0152042 | A1 | 7/2007 | Mittler | |
| 2008/0094373 | A1 | 4/2008 | Song | |
| 2008/0224359 | A1 | 9/2008 | Hsu | |

FOREIGN PATENT DOCUMENTS

| | | |
|---|---|---|
| CN | 101 576 774 A | 11/2009 |
| CN | 101673633 A | 3/2010 |
| CN | 101 697 182 A | 4/2010 |
| CN | 101697182 A | 4/2010 |
| CN | 201489599 U | 5/2010 |
| CN | 201 522 951 U | 7/2010 |
| CN | 201522951 U | 7/2010 |
| CN | 101930633 A | 12/2010 |
| EP | 1 729 205 A2 | 12/2006 |
| WO | WO 9922341 A1 | 5/1999 |
| WO | WO 2007148902 A1 | 12/2007 |

OTHER PUBLICATIONS

Extended European Search Report dated Apr. 7, 2014 from corresponding European Application No. PCT/CN2011/077472.

* cited by examiner

US 8,872,047 B2

ANTI-PRYING ENCRYPTED KEYBOARD

The present application is the U.S. National Phase of International Application No. PCT/CN2011/077472, titled "ANTI-PRYING ENCRYPTED KEYBOARD", filed on Jul. 22, 2011, which claims the benefit of priority to Chinese patent application No. 201010269450.2 titled "ANTI-POKING ENCRYPTION KEYBOARD", filed with the Chinese State Intellectual Property Office on Aug. 27, 2010. The entire disclosures thereof are incorporated herein by reference.

TECHNICAL FIELD OF THE INVENTION

The present invention relates to an encryption keyboard, and in particular to an to anti-poking encryption keyboard.

BACKGROUND OF THE INVENTION

The hard encryption keyboard of a bank self-service equipment bears works of inputting and encrypting a bank password of a user, and thus a working key and a master key of the bank are stored in a core processing part of the keyboard. For an unspeakable purpose, some criminals usually jimmy or poke the keyboard to steal the user password and even to decrypt the working key and master key of the bank in order to steal bank information, which threatens the security of information and money of the user and the bank directly.

The encryption keyboard is generally provided with a poking detection and protection structure and a poking detection and protection circuit. When the encryption keyboard is subjected to a physical poking, the poking detection and protection circuit outputs a self-destruction signal to realize a self-destruction function of the encryption keyboard, so as to prevent the criminals from stealing bank information.

A conventional encryption keyboard generally includes a keyboard panel, a plastic lining plate, keystrokes, water-proof silicone rubber, a main control board and a bottom board, and the above components are firmly assembled with bolts and nuts. Contact surfaces of the plastic lining plate and the water-proof silicone rubber are generally smooth flat surfaces so as to enable the plastic lining plate and the water-proof silicone rubber to abut against each other in parallel. Additionally, for the purpose of water-proof, the water-proof silicone rubber must have a certain thickness generally being 0.5 mm. However, an aggressor may easily penetrate through the water-proof silicone rubber of 0.5 mm with a heated iron wire and then lead out a conductive wire below the keystrokes so as to communicate with the encryption keyboard and thus to steal information such as user's password and bank key.

SUMMARY OF THE INVENTION

The object of the present invention is to provide an anti-poking encryption keyboard which may prevent information such as the user's password and the bank key from being stolen.

The present invention provides an anti-poking encryption keyboard, including a keyboard panel and a lining plate, a water-proof silicone rubber, a main control board and a bottom board which are assembled below the keyboard panel in sequence, wherein a protrusion ring is provided on the periphery of a surface of the lining plate abutting against the water-proof silicone rubber.

Preferably, when the anti-poking encryption keyboard is assembled, the lining plate presses the water-proof silicone rubber, and a thickness of the water-proof silicone rubber at a position pressed by the protrusion ring is less than 0.2 mm.

Preferably, the lining plate is made of metal material.

Preferably, the water-proof silicone rubber is correspondingly provided with a groove at a position contacting with the protrusion ring of the periphery of the lining plate.

Preferably, two protrusion rings are provided.

Preferably, the water-proof silicone rubber is provided with two grooves.

Preferably, a depth of the groove is less than a height of the protrusion ring.

Preferably, a thickness of the water-proof silicone rubber at the grooves is less than 0.2 mm.

The embodiments of the present invention have following advantages.

In the present invention, since the protrusion rings are disposed on the periphery of the surface of the lining plate abutting against the water-proof silicone rubber, pressing force is generated when the modules of the keyboard are assembled together. Thus, the lining plate presses the water-proof silicone rubber when the anti-poking encryption keyboard is assembled, and the thickness of the pressed water-proof silicone rubber at the position corresponding to the protrusion ring is less than 0.2 mm. In this way, the aggressor can not penetrate through the lining plate or the silicone rubber to reach the inside of the encryption keyboard easily. This may effectively prevent the conductive wire from being illegally led out from the inside of the encryption keyboard, so as to protect the keyboard information effectively and improve the security performance. Further, since the lining plate is improved by being made of metal material, it is possible to effectively prevent the melting attack from the side of the encryption keyboard. Besides, the thickness of the other portions of the water-proof silicone rubber is not changed, which ensures the water-proof function of the keyboard.

DETAILED DESCRIPTION OF THE INVENTION

Hereinafter, the technical solutions in embodiments of the present invention will be described clearly and completely in conjunction with drawings in the embodiments of the present invention. Apparently, the described embodiments are only a part of, not all of embodiments of the present invention. Based on the embodiments of the present invention, all of other embodiments made by the person skilled in the art without inventive effort are deemed to fall in the protection scope of the present invention.

Figure 1:
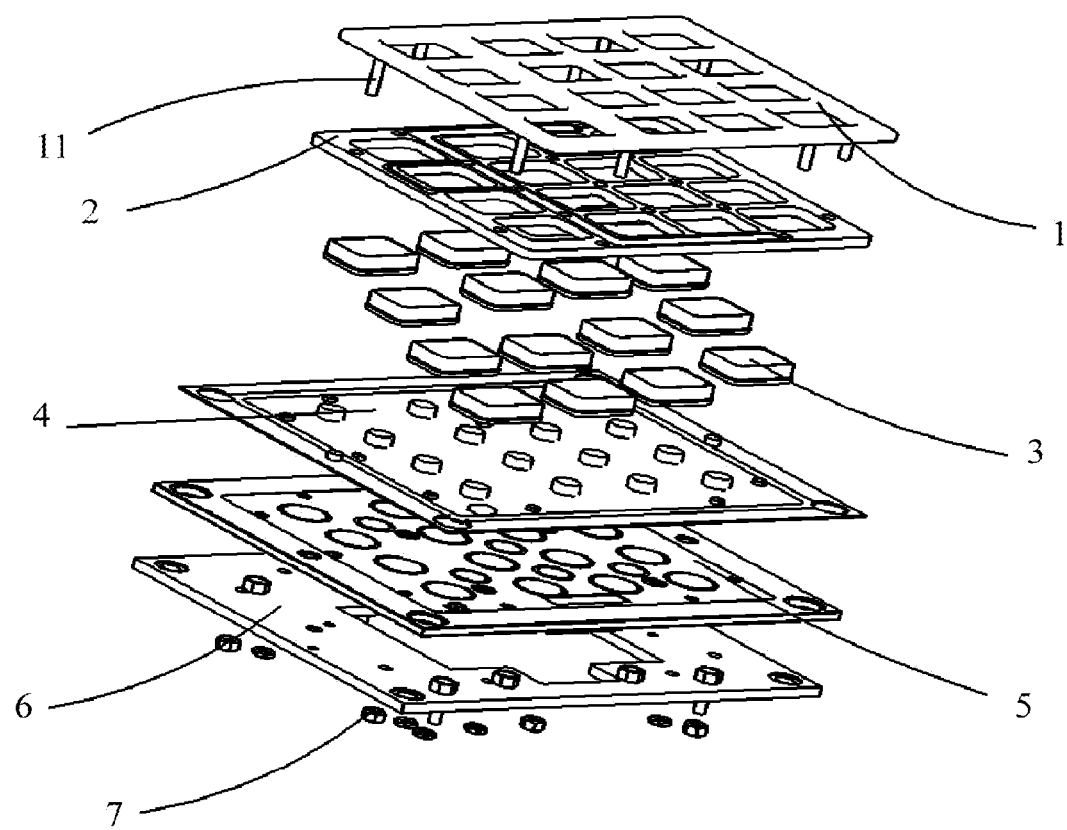
FIG. 1 is an exploded view of an encryption keyboard according to the present invention.

Referring to FIG. 1, an exploded view of an anti-poking encryption keyboard to according to the present invention is shown. The anti-poking encryption keyboard includes a keyboard panel 1, a lining plate 2, keystrokes 3, water-proof silicone rubber 4, a main control board 5 and a bottom board 6. Nine assembling bolts 11 are provided on the keyboard panel 1. The lining plate 2, the keystrokes 3, the water-proof silicone rubber 4, the main control board 5 and the bottom board 6 are assembled on the bolts 11 of the keyboard panel 1 in sequence, and the assembly of the components is completed by screwing tightly assembling nuts 7 on a side surface of the bottom board 6 away from the keyboard panel 1. A protrusion ring is provided on the periphery of a surface of the lining plate 2 abutting against the water-proof silicone rubber 4.

Figure 2:
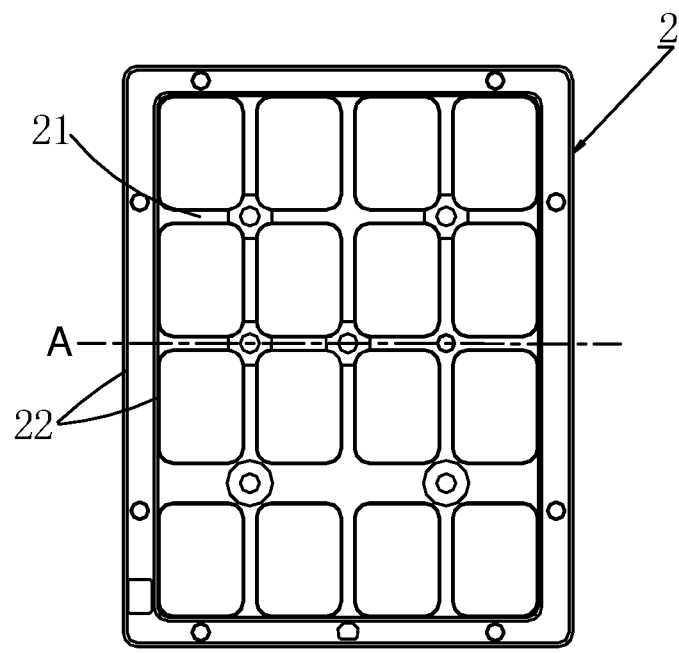
FIG. 2 is a structural view of a lining plate according to the present invention.
Figure 3:
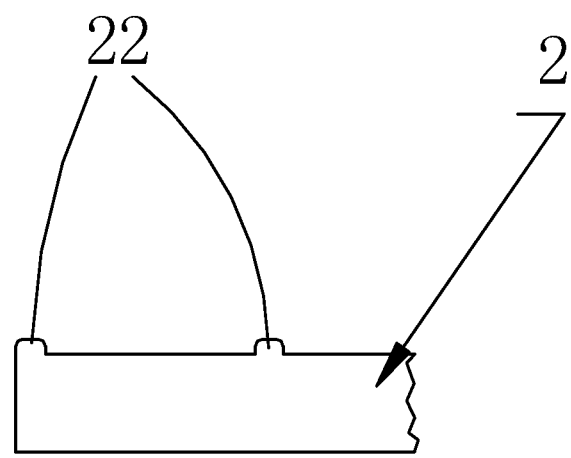
FIG. 3 is a partially schematic view of the cross section taken along line A in FIG. 2.

Also referring to FIGS. 2 and 3, FIG. 2 is a structural view of a lining plate according to the present invention, and FIG. 3 is a partially schematic view of the cross section taken along line A in FIG. 2.

The lining plate is made of metal material, and two protrusion rings 22 are provided on the periphery of a side surface 21 of the lining plate away from the keyboard panel. When the anti-poking encryption keyboard is assembled, the lining plate 2 presses the water-proof silicone rubber 4, and the thickness of the pressed water-proof silicone rubber at the positions corresponding to the protrusion rings 22 is less than 0.2 mm.

Figure 4:
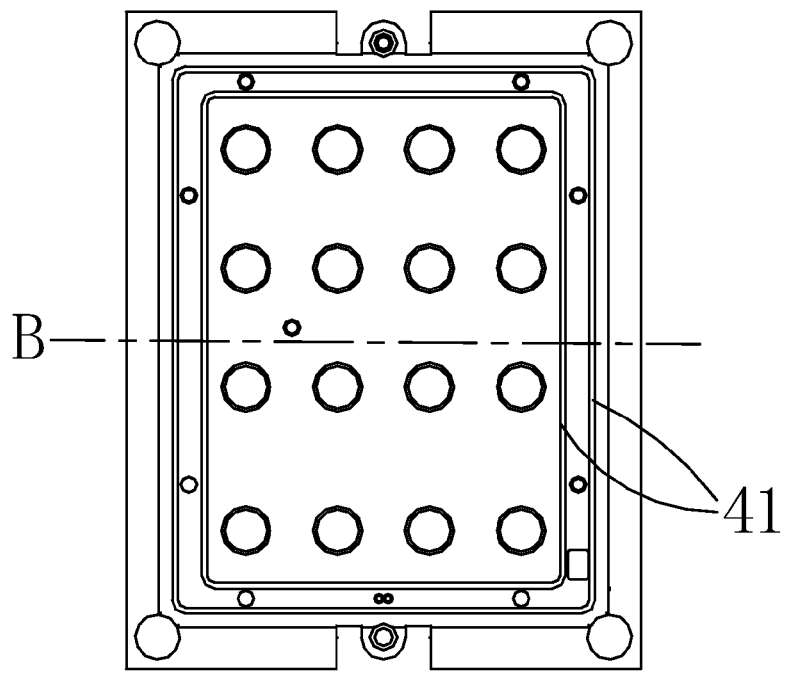
FIG. 4 is a structural view of a water-proof silicone rubber according to the present invention.
Figure 5:
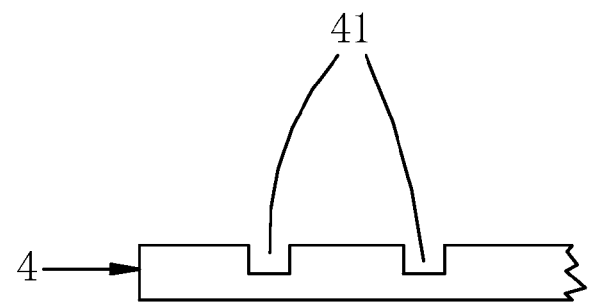
FIG. 5 is a partially schematic view of the cross section taken along line B in FIG. 4.

Also referring to FIGS. 4 and 5, FIG. 4 is a structural view of a water-proof silicone rubber according to the present invention, and FIG. 5 a partially schematic view of the cross section taken along line B in FIG. 4.

The water-proof silicone rubber 4 is provided with grooves 41 correspondingly at positions where contact with the protrusion rings 22 of the periphery of the lining plate 2. The depth of two grooves 41 is less than the height of the two protrusion rings 22, and the thickness of the water-proof silicone rubber 4 at the grooves is less than 0.2 mm.

Figure 6:
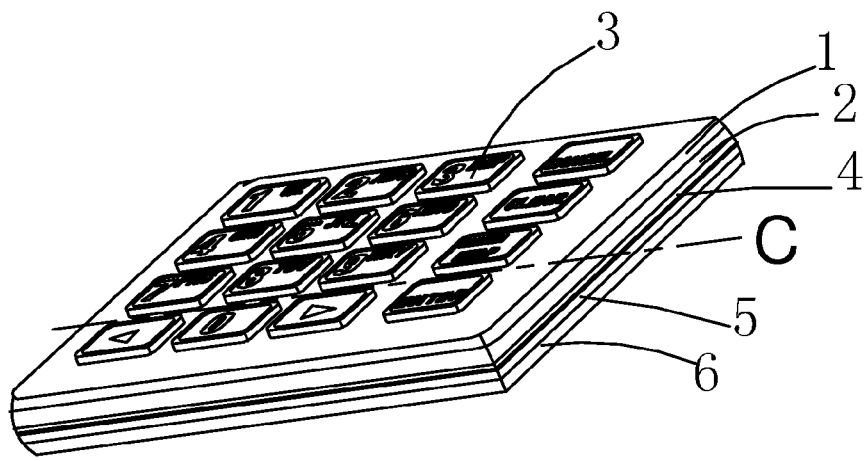
FIG. 6 is a perspective schematic view of an anti-poking keyboard according to the present invention.
Figure 7:
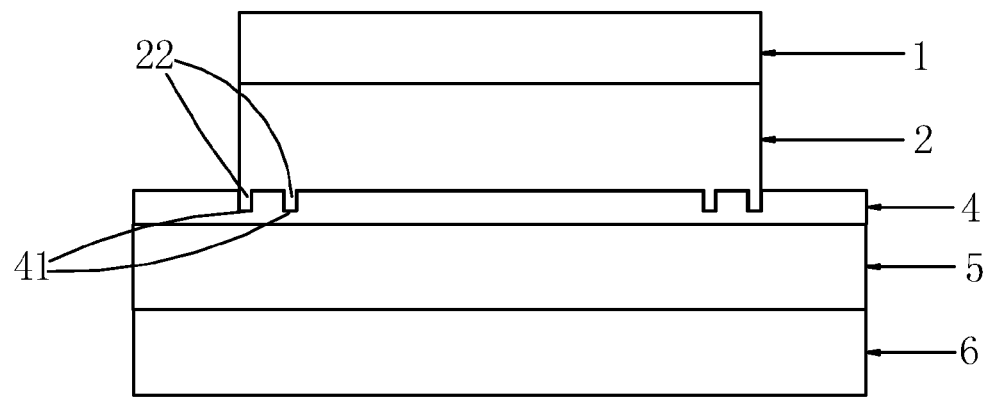
FIG. 7 is a partially schematic view of the cross section taken along line C in FIG. 6.

Also referring to FIGS. 6 and 7, FIG. 6 is a perspective schematic view of an anti-poking encryption keyboard according to the present invention, and FIG. 7 is a partially schematic view of the cross section taken along line C in FIG. 6.

The lining plate 2, the water-proof silicone rubber 4, the main control board 5 and the bottom board 6 are assembled in sequence by the nine bolts 11 disposed on the keyboard to panel 1. The keystrokes are movably fixed between the keyboard panel and the main control board, and pass through keystroke holes in the lining plate. The assembly of the components is completed by screwing tightly the assembling nuts 7 on the side surface of the bottom board 6 away from the keyboard panel 1. The protrusion rings 22, which are disposed on the periphery of the surface 21 of the metal lining plate 2 contacting with the water-proof silicone rubber 4, fit right into the grooves 41 of the water-proof silicone rubber 4 respectively. Under the action of the pressing force generated from the fastening of bolts and nuts, the thickness of the water-proof silicone rubber at the grooves 41 after being pressed by the protrusion rings 22 is less than 0.2 mm which is less than a diameter of the present thinnest needle. Thus, it is possible to effectively prevent the aggressor from penetrating through the water-proof silicone rubber 4 with heated iron wire, from leading out the conductive wire below the keystrokes and from obtaining information such as user's password and bank key. Consequently, the security performance of the encryption keyboard may be effectively improved. In addition, the thickness of the other portions of the water-proof silicone rubber is still 0.5 mm, which may ensure the water-proof performance of the whole encryption keyboard.

In the present invention, since the lining plate is improved by being made of metal material, it is possible to effectively prevent the melting attack from the side of the encryption keyboard. Besides, two protrusion rings are provided on the periphery of the surface of the lining plate contacting with the silicone rubber, and under the action of the pressing force when modules of the keyboard are assembled together, the thickness of the water-proof silicone rubber at grooves is less than 0.2 mm, i.e. the diameter of the present thinnest needle. In this way, the aggressor can not penetrate the lining plate or the silicone rubber to reach the inside of the encryption keyboard easily. This may effectively prevent the conductive wire from being illegally led out from the inside of the encryption keyboard, so as to protect the keyboard information effectively and improve the security performance. In addition, the thickness of the other portions of the water-proof silicone rubber is not changed, which ensures the water-proof function of the keyboard.

Based on the above description, many modifications and improvements may be made to by the person skilled in the art without departing from the principle of the present invention, and these modifications and improvements should be deemed to fall into the protection scope of the present invention.

What is claimed is:

1. An anti-poking encryption keyboard, comprising a keyboard panel and a lining plate, a water-proof silicone rubber, a main control board and a bottom board which are assembled below the keyboard panel in sequence, characterized in that a protrusion ring is provided on a periphery of a surface of the lining plate abutting against the water-proof silicone rubber.

2. The anti-poking encryption keyboard according to claim 1, wherein two protrusion rings are provided.

3. The anti-poking encryption keyboard according to claim 1, wherein when the anti-poking encryption keyboard is assembled, the lining plate presses the water-proof silicone rubber, and a thickness of the pressed water-proof silicone rubber at a position corresponding to the protrusion ring is less than 0.2 mm.

4. The anti-poking encryption keyboard according to claim 3, wherein two protrusion rings are provided.

5. The anti-poking encryption keyboard according to claim 1, wherein the lining plate is made of metal material.

6. The anti-poking encryption keyboard according to claim 5, wherein two protrusion rings are provided.

7. The anti-poking encryption keyboard according to claim 1, wherein the water-proof silicone rubber is correspondingly provided with a groove at a position contacting with the protrusion ring of the periphery of the lining plate.

8. The anti-poking encryption keyboard according to claim 7, wherein a depth of the groove is less than a height of the protrusion ring.

9. the anti-poking encryption keyboard according to claim 7, wherein two protrusion rings are provided.

10. The anti-poking encryption keyboard according to claim 7, wherein the water-proof silicone rubber is provided with two grooves.

11. The anti-poking encryption keyboard according to claim 10, wherein a thickness of the water-proof silicone rubber at the grooves is less than 0.2 mm.

* * * * *